United States Patent Office
3,388,086
Patented June 11, 1968

3,388,086
EPOXY RESINS FROM A HARDWOOD TAR AND AN EPIHALOHYDRIN
Herman P. Doerge, Verona, and Joseph F. Bosso, Lower Burrell, Pa., assignors to Pittsburgh Plate Glass Company, Pittsburgh, Pa., a corporation of Pennsylvania
No Drawing. Filed June 1, 1965, Ser. No. 460,481
5 Claims. (Cl. 260—28)

ABSTRACT OF THE DISCLOSURE

Thixotropic epoxy resins are obtained by reacting an epihalohydrin with a hardwood tar in an alkaline medium. The preferred embodiment comprises a glycidyl polyether prepared from the condensation reaction product of epichlorohydrin and hardwood tars having hydroxyl numbers of from about 40 to about 300. The thixotropic epoxy resins are cured by conventional epoxy curing agents and may be used as adhesives and coatings.

---

This invention relates to novel glycidyl polyethers of hardwood tars. More particularly, this invention relates to thixotropic glycidyl polyethers obtained by reacting in an alkaline medium, an epihalohydrin such as epichlorohydrin with a hardwood tar. This invention especially pertains to thixotropic glycidyl polyether resins of a hardwood tar wherein about 10 percent to substantially 100 percent, and preferably about 25 percent to about 100 percent, of the hydroxyl groups of the hardwood tar have been reacted with an epihalohydrin.

Hardwood tars obtained by the thermal decomposition, in the substantial absence of oxygen, of hardwoods such as birch, beech, hickory, oak, ash, locust, hackberry, maple and the like, have had limited industrial application, and have been used primarily as a source of fuel in carbonization processes. Some industrial applications include use as extenders for synthetic resins, as softeners for rubber, as a preservative in water-proofing agents for fiber, and as special lubricants. These applications utilize primarily the physical characteristics of the wood tars. Utilization of the wood tars as a reaction component has been limited.

The exact composition of hardwood tars is unknown and varies somewhat depending upon the source, although it is known that the hardwood tars contain numerous organic compounds such as crotonaldehyde, butyrolacetone, pyrocatechol, and the like. Furthermore, it is known that the wood tars generally have a hydroxyl number in the range of about 40 to about 300.

The hardwood tars used in this invention are ordinarily obtained from the pyrolization of hardwood at temperatures of about 500° F. to about 800° F. Pyrolization conducted in the substantial absence of oxygen reduces the wood to charcoal and vaporizes the organic compounds and organic resins contained in the wood. The vaporized materials are recovered and condensed. The wood tars are that portion of the condensate which have had the more volatile materials removed. The wood tars useful in this invention are resinous liquids or solids containing substantially no volatile materials having a boiling point of less than about 80° C. As mentioned above, these hardwood tars generally have a hydroxyl number of about 40 to about 300.

The novel polyglycidyl ethers of this invention can be prepared from hardwood tars having hydroxyl numbers of about 40 to about 300; however, commercially useful polyglycidyl ethers are obtained from hardwood tars having a minimum hydroxyl number of about 150, with the best results obtained from polyglycidyl ethers of hardwood tars having a hydroxyl number in excess of about 200.

It has been discovered that the novel polyglycidyl ethers of this invention are particularly useful and are unique among epoxy resins in that they exhibit thixotropic properties. Thixotropy is a desirable property, especially when coating compositions are to be prepared from the thixotropic resin, inasmuch as separation and settling of pigments is minimized during storage of the coating composition. Also, thixotropy diminishes the tendency for a coating composition to drip from a paintbrush or other applicator and reduces the possibility of accidently spilling the contents from their container. Thus, the polyglycidyl ethers of this invention are advantageous and unique in that they are thixotropic without requiring the addition of a thixotropic agent.

The novel polyglycidyl ethers of this invention are prepared by reacting a hardwood tar of the type described above with an epihalohydrin in an alkaline media. Novel polyglycidyl ethers result when either component is used in excess; however, it is preferred to utilize the reactants in approximately equivalent amounts up to an excess of about 10 equivalents of epihalohydrin per hydroxyl equivalent of hardwood tar, with the optimum ratio of equivalents of epihalohydrin to hydroxyl equivalent of hardwood tar being in the range of about 2:1 to about 7:1.

A typical method for the preparation of the novel polyglycidyl ethers of this invention involves heating a hardwood tar of the type described above with an excess of epihalohydrin in an alkaline media, and thereafter removing the volatiles by distillation. The temperature range for this process may be from about 50° C. or lower to about 150° C. or higher, although a temperature of about 80° C. to about 110° C. is preferred. The alkaline media is generally provided by the presence of sodium hydroxide, potassium hydroxide and the like.

The epihalohydrins useful in this invention are those epihalohydrins which have 3 to 6 carbon atoms. The halogen atom is always attached to a carbon atom adjacent the oxirane ring. These epihalohydrins are aliphatic in nature and include epichlorohydrin, epibromohydrin, epiiodohydrin, and epiflorohydrin. The epihalohydrin more commonly utilized is epichlorohydrin, which has the formula:

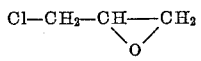

As mentioned above, the novel polyglycidyl ethers in this invention are thixotropic in nature and are particularly useful inasmuch as coating compositions of a thixotropic nature can be prepared which have high resistance to attack by chemicals, solvents, moisture, and high temperatures. The novel polyglycidyl ethers are further useful in that epoxy resins prepared therefrom are adherent to concrete, masonry, metal, wood and glass, and other rigid and semi-rigid substrates.

The novel polyglycidyl ethers of this invention are further significant in that coreaction products and blends of these polyglycidyl ethers retain their thixotropic properties when they are present in a major amount. For example, blends of novel polyglycidyl ethers of hardwood tars and polyglycidyl ethers of bisphenol-A are thixotropic when the former polyglycidyl ether is present in a major amount, e.g., as at least about 50 percent by weight of the total resin. Coreaction products of epihalohydrin with hardwood tar and polyphenols, for example, novolak resins, exhibit thixotropic properties when the hardwood tar is the major constituent.

The novel polyglycidyl ethers of this invention may be cured to a hard, abrasion-resistant, solvent-resistant condition by use of conventional epoxy curing agents such as acids, amines or the like. Typical amine curing agents include difunctional or polyfunctional amines such as polyamines, alcohol amines, polyamides containing amino groups, or combinations of these with monoamines containing groups having a plurality of nitrogen atoms with at least one hydrogen atom attached thereto that is reactive with the oxirane oxygen of the epoxy group.

The specific choice of active hydrogen-containing curing agent will be determined by the desired pot life and the final properties desired in the cured material. Representative compounds which may be used alone or as mixtures thereof are N-aminopropylmorpholine, 2,2-aminoethylaminoethanol, polyglycol amine, triethylenetetramine, toluenediamine, diethylenetriamine, di- and trimerized fatty acids reacted with polyamines such as ethylenediamine and amines such as tetraethylenepentamine, pentaethylenehexamine, methylaminopropylamine and isopropylaminopropylamine.

The acids utilized as epoxy curing agents include the acid anhydrides such as phthalic anhydride, maleic anhydride, hexahydrophthalic anhydride, and pyromelliticdianhydride. Other acid curing agents as well as amine curing agents may be found in Epoxy Resins, Their Applications and Technology by Lee and Neville, McGraw-Hill Book Company, Inc. (1957), at pages 63 through 141.

The novel polyglycidyl ethers may be cured in the presence of appropriate diluents, fillers, resinous modifiers, plasticizers and flexibilizers. A complete list of such an additives and their method of utilization may be found in Epoxy Resins, supra, at pages 141 through 183.

The following examples illustrate in detail the novel features of this invention. The examples are not intended to limit the invention, however, for there are, of course, numerous possible variations and modifications.

The hardwood tars utilized in the following examples were resinous liquids or solids containing substantially no volatile materials having a boiling point of less than about 80° C.

EXAMPLE I

A polyglycidyl ether was prepared from the following ingredients:

| | Grams | No. of Equivalents |
|---|---|---|
| Liquid hardwood tar (Hydroxyl No., 189.4; acid value, 53.4). | 382.5 | 1.3 |
| Epichlorohydrin | 484.0 | 5.25 |
| Sodium hydroxide (97 percent purity) | 66.0 | 1.6 |

The hardwood tar and epichlorohydrin were introduced into a vessel equipped with stirrer, thermometer, azeotrope adapter, and reflux condenser. The reaction ingredients were heated to 90 to 95° C. at reduced pressure and maintained at about that temperature for about eight hours. The sodium hydroxide was introduced intermittently at about 30 minute intervals over the eight hour period.

At the end of the reaction period, a minor amount of acetic acid, about 0.6 gram, was added to neutralize the solution.

The solution was then filtered once through a coarse, porous filter and then distilled to remove the excess epichlorohydrin.

About 378 grams of polyglycidyl ether of hardwood tar were obtained for a yield of 85 percent. This product had an epoxy equivalent of about 360. The product had a clear, dark brown color and was fluid. However, after sitting for sixteen hours, it evidenced thixotropic properties. A container of the material could be inverted without resulting in any flow of the polyglycidyl ether; however, after the material was stirred, it flowed readily.

The polyglycidyl ether (20 grams) was blended with 7.9 grams of Versamid 125 in 6.0 grams of toluene. The solution was stirred until uniform, and then a film was drawn on a steel panel. The remaining material was poured into an aluminum dish.

The panel and dish were placed in an oven at about 65° C. for a period of about 16 hours. The cured film was tack free, although somewhat soft. The material in the aluminum dish had gelled.

The epoxy film of this example was etched by 10 percent and 20 percent acetic acid; however, no change was observed in the film after being subjected to 10 percent and 20 percent nitric acid for 50 minutes.

EXAMPLE II

The following epoxy resins were prepared from a hardwood tar by reaction with epichlorohydrin in the manner set forth in Example I:

Table 1

| | Resin A | Resin B | Resin C |
|---|---|---|---|
| Hardwood tar (type) | (¹) | (¹) | (²) |
| Percent nitrogen in tar | 0.53 | 0.53 | 0.30 |
| Number of equivalents of tar | 1.0 | 0.84 | 1.0 |
| Number of equivalents of bisphenol-A | | 1.0 | |
| Number of equivalents of novolak resin | | | 0.76 |
| Number of equivalents of epichlorohydrin | 4.03 | 7.0 | 7.05 |
| Number of equivalents of NaOH | 1.0 | 1.84 | 1.66 |
| Reaction time in hours | 6 | 5½ | 6¾ |
| Reaction temperature in degrees centigrade | 90–95 | 90–95 | 90–95 |
| Water of reaction collected, as percent of theory | 78.3 | 54.5 | 100 |
| Method of purification | (³) | (³) | (³) |
| Percent yield | 90.4 | 94.8 | 87.5 |
| Resin appearance | (⁴) | (⁴) | (⁴) |
| Epoxy equivalent (theory) | 374.0 | 273.0 | 272.0 |
| Epoxy equivalent (actual) | 664.1 | 463.8 | 536.6 |
| Percent chlorine | 1.37 | | |

¹ 30° C. flow point.
² Liquid.
³ Filtration.
⁴ Liquid, viscous.

All of the above resins developed thixotropic properties within several hours of preparation.

Films were prepared 3 millimeters thick on steel panels. The films were cured with Versamid 125 and each exhibited fair strength, high gloss, good adhesion and some flexibility.

A 3 millimeter film of Resin C was cured with a primary amine. The film exhibited good strength, high gloss, but was slightly brittle.

The novolak resin utilized in the above table is a phenol-aldehyde condensation product having a hydroxyl number of about 574 and an acid value of about 48.9. Other novolak resins may be utilized; for example, novolak resins having hydroxyl members from about 200 to about 800.

Bisphenol-A is the conventional name for 2,2-bis(4-hydroxyphenyl propane).

The 30° C. flow point hardwood tar used in the above example was a hardwood tar having a hydroxyl number of about 214, and which begins to flow at a temperature of 30° C.

EXAMPLE III

In a manner similar to that set forth in Example I, about 1.0 equivalent of a hardwood tar having a 30° C. flow point and a hydroxyl number of about 214, and about 0.8 equivalent of a phenolic resin were coreacted with about 7.2 equivalents of epichlorohydrin in the presence of about 1.8 equivalents of sodium hydroxide. Reaction was conducted at about 85° C. to 90° C. for a period of about 3 hours. About 97 percent of the theoretical water of reaction was collected.

The reaction product was washed and a yield of 89.3 percent was obtained. The resin was very viscous and had the epoxy equivalent of 362.8. The theoretical epoxy equivalent was calculated to be about 240. The reaction product had a chlorine content of 1.06 percent.

This hardwood tar-phenolic resin epoxide was compared with Epon 864, which is an epoxide resin having comparable viscosity and epoxy equivalency. The hardwood tar-phenolic resin epoxide was blended with Epon 826 in a ratio of 50/50 by weight and labeled Resin III-A. Epon 864 epoxide was blended with Epon 826 epoxide in a proportion of 50/50 by weight and labeled Resin III-B.

Both Resin III-A and Resin III-B were cured with two different hardeners, each hardener being used in slight excess of the stoichiometrical quantity required. One hardener was an aliphatic amine-polyamide blend, and the other hardener was Versamid 125. The specimens were tested for shear strength at a one-half inch overlap in accordance with Specification MIL-A-5090.

The following table shows the results obtained.

Table 2

The following resins were cured at room temperature for seven days:

| Hardener System | Test Condition | Resin III-A, p.s.i. | Resin III-B, p.s.i. |
| --- | --- | --- | --- |
| Blend of 2 parts Versamid 115 to 1 part of triethylenetetramine. | Room temperature. | 1,830 | 1,580 |
| Do | 140° F | 760 | 550 |
| Versamid 125 | Room temperature. | 3,000 | 2,150 |
| Do | 140° F | 850 | 900 |

Table 3

The following resins were cured at 120° F. for 18 hours:

| Hardener System | Test Condition | Resin III-A, p.s.i. | Resin III-B, p.s.i. |
| --- | --- | --- | --- |
| Blend of 2 parts Versamid 115 to 1 part of triethylenetetramine. | Room temperature. | 2,320 | 1,950 |
| Do | 140° F | 1,630 | 2,450 |
| Versamid 125 | Room temperature. | 3,350 | 3,000 |
| Do | 140° F | 1,600 | 1,900 |

The hardwood tar resin compared favorably and appeared to exceed the strength characteristics of Epon 864, a commercial resin, in many instances.

The phenolic resin utilized in this experiment is a mixture of polyphenols consisting primarily of trihydroxydiphenyls, with minor amounts of resorcinol, dihydroxydiphenyls and monohydroxydiphenyls. The above phenolic resin had a hydroxyl number range of about 650 to 680; however, useful phenolic resins may have a hydroxyl value of about 500 or less to about 800 or more.

In the above examples, Versamid 125 is a linear polymer having a viscosity of about 700–900 centipoises at 75° C., an amine equivalent of about 350; while Versamid 115 is a linear polymer having a viscosity of about 3100 to 3800 centipoises at 75° C. and an amine equivalent of about 240. These polymers are prepared by reacting dimeric fatty acid with various polyamines.

EXAMPLE IV

The hardwood tar-phenolic resin epoxide of Example III was very viscous, which caused difficulties in determining whether the product was thixotropic. In order to definitely observe the thixotropic properties, 493.1 grams of the epoxide of Example III was diluted with 54.8 grams of xylene to obtain an 86 percent solids material having an epoxy equivalent of 436.0.

After the 86 percent solids material had set for three days, thixotropy was very evident.

Although specific examples of the invention have been set forth hereinabove, it is not intended that the invention be limited solely thereto, but to include all the variations and modifications falling within the scope of the appended claims.

What is claimed is:

1. The thixotropic epoxy resins obtained from the reaction of a hardwood tar having a hydroxyl number of from about 40 to about 300 and containing substantially no volatile materials having a boiling point of less than about 80° C. and an epihalohydrin wherein the ratio of equivalents of epihalohydrin to hydroxyl equivalent of hardwood tar is from about 1:1 to about 10:1.

2. The thixotropic epoxy resin of claim 1 wherein the hardwood tar is the condensate obtained from the pyrolization of hardwood, said condensate having substantially no volatile materials having a boiling point of less than about 80° C.

3. The thixotropic resin of claim 1 wherein the epihalohydrin has 3 to 6 carbon atoms.

4. The thixotropic epoxy resin of claim 1 wherein the epihalohydrin is epichlorohydrin.

5. The thixotropic epoxy resin obtained by blending a major amount of the thixotropic epoxy resin of claim 1 with a minor amount of a polyglycidyl ether of bisphenol A.

References Cited

UNITED STATES PATENTS

| | | | |
| --- | --- | --- | --- |
| 2,190,033 | 2/1940 | Levesque | 260—24 |
| 2,456,408 | 12/1948 | Greenlee | 260—47 |
| 2,694,694 | 11/1954 | Greenlee | 260—47 |
| 2,925,426 | 2/1960 | Schroeder | 260—47 |
| 3,012,487 | 12/1961 | Mika | 260—28 |

OTHER REFERENCES

Hagglund, Chemistry of Wood, Academic Press Inc., Publishers, New York, 151, pp. 531 to 539.

MORRIS LIEBMAN, *Primary Examiner.*

B. A. AMERNICK, *Assistant Examiner.*